United States Patent [19]

Boutmy et al.

[11] 3,818,360

[45] June 18, 1974

[54] REGENERATIVE REPEATER OUTPUT STAGE FOR BIPOLAR CODED MESSAGE SIGNALS

[75] Inventors: Patrick E. Boutmy; Gilbert J. Le Fort, both of Lannion; Daniel J. M. Betoule, Perros-Guirec, all of France

[73] Assignee: Societe Anonyme De Telecommunications, Paris, France

[22] Filed: Mar. 12, 1973

[21] Appl. No.: 340,380

[30] Foreign Application Priority Data

June 23, 1972 France ............................ 72.22779

[52] U.S. Cl. .................. 330/15, 330/30 R, 330/31, 330/40, 330/195

[51] Int. Cl. .............................................. H03f 3/26

[58] Field of Search.... 333/15, 30 R, 31, 40, 124 R, 333/195, 196

[56] References Cited

UNITED STATES PATENTS 3,373,373 3/1968 McClure ........................ 330/15 UX

*Primary Examiner*—Herman Karl Saalbach
*Assistant Examiner*—James B. Mullins

[57] ABSTRACT

An output stage for a bipolar coded signal amplifier, having two pairs of input terminals receiving signals of the same polarity, and one pair of output terminals delivering bipolar signals. It comprises two transistors of the same type of conductivity, combined with a four-port directional coupler, thanks to the use of a suitably connected semiconductor diode, the average d.c. supply current of the circuit is lower than that of the known systems. A variant of embodiment includes a third transistor.

3 Claims, 3 Drawing Figures

REGENERATIVE REPEATER OUTPUT STAGE FOR BIPOLAR CODED MESSAGE SIGNALS

The invention relates to an electronic device which can form the last stage in a regenerative repeater for digital messages transmitted in bipolar code, i.e. made up of a series of square-wave elementary signals having a constant individual duration, each of which can be in one of three significant states, which are often conventionally represented by (+1), 0 and (−1).

It is known that, in certain bipolar codes, messages of the aforementioned kind are made up by a succession of alternately positive and negative signals which may or may not be separated by zero-amplitude signals, in which case the signals are subject to the "law of bipolarity." There may, however, be some "violations" of bipolarity, introduced intentionally or otherwise into the messages. In all its forms, the device according to the invention is applicable not only to messages made up of signals of alternating polarity, but also to a sequence of signals having positive, negative or zero values following one another in any given order.

When the signals are transmitted at high speed (e.g. of the order of 10 million signals per second) and when the signals are transmitted on a transmission line, a number of regenerative repeaters have to be disposed at relatively short distances along the line in order to prevent the signals from being attenuated and distorted. Consequently, the repeaters disposed along a given length of line together consume a large amount of d.c. supply current. One aim of the invention is to ensure that the repeater output stage consumes less supply current than it does in conventional devices.

In general, the device according to the invention is applicable to a signal regenerative repeater, which, in its first stages, restores the signal wave form, provides intermediate amplification, and separates the input signals into two channels each transmitting signals having a single polarity and an amplitude which, in one channel, reproduces the sequence of absolute values (or moduli) of the positive-amplitude signals received and, in the other channel, reproduces the sequence of absolute values of the negative-amplitude signals received. The device according to the invention has two inputs connected to the two channels and an output which is connected to a transmission line and which re-transmits the message received at the input of the regenerative repeater after regenerating and amplifying the said message and restoring the appropriate polarity to the signals from each of the two channels.

The invention relates to a device for amplifying digital signals having two pairs of input terminals and one pair of output terminals which can be connected to a transmission line, wherein each pair of input and output terminals comprises an isolated terminal and a ground or reference-potential terminal, the device comprising:

two transistors having the same type of conductivity the bases of which are respectively connected to one of the insulated terminals in the pairs of input terminals and the emitters of which are connected by a common connection;

a directional octopole (or four-port coupler) having four pairs of terminals comprising a first, a second, a third and a fourth insulated terminal respectively and having a common constant potential terminal, the octopole comprising, firstly, a single-winding transformer having a mid-point, the ends of the winding of which form the first and second terminals and, secondly, a transformer having two separate windings, the first of which connects the third terminal to the said mid-point and the second of which connects the fourth terminal to be second terminal;

two connections connecting the transistor collectors to the first and second terminals respectively;

a first and a second d.c. voltage source having opposite polarities and having a common terminal connected to ground, their other terminals being respectively connected by low-pass filter means, firstly to the third terminal and secondly to the common connection via a bias resistor;

the insulated output terminal being connected by a connecting capacitor to the fourth terminal, and the device also comprising a matching impedance comprising a capacitor and a matching resistor in series, forming an assembly which connects the mid-point to ground;

the device being such that the common point to the capacitor and the matching resistor is connected to the common connection by a semiconducting diode connected in its direct conduction direction.

In an improved alternative embodiment, the device according to the invention comprises a third transistor, having the same type of conductivity as the aforementioned two transistors, the base of which is connected to a point at a constant potential which is substantially equal to the average between the extreme levels of the signals applied to the insulated input terminals, the emitter of which is connected to the emitters of the other two transistors, and the collector of which is connected across a resistor to the third insulated terminal of the directional octopole.

The device according to the invention comprises a differential coupler, the construction and use of which are well known. A coupler of this kind has been described e.g. in Canadian Patent specification No. 909,378, wherein FIGS. 1 to 5 inclusive show the possible uses of the differential coupler.

The invention and its advantages will be more clearly understood from the following detailed description and accompanying drawings, in which.

Figure 1:
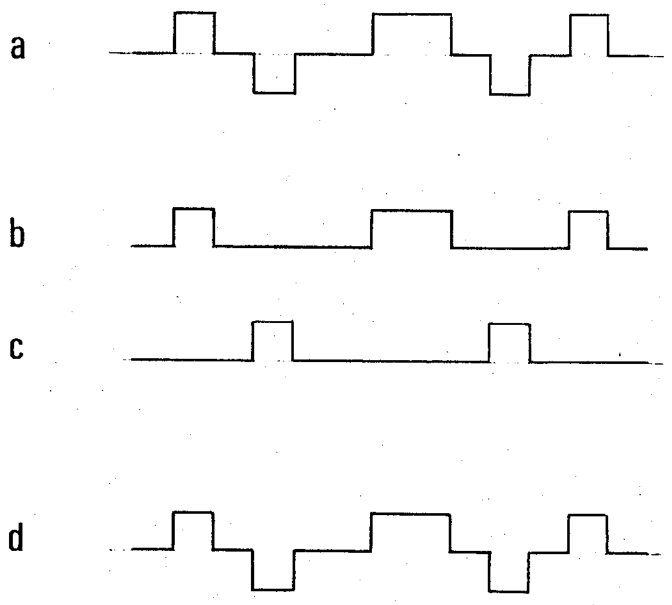
FIG. 1 is an amplitude/time diagram showing an example of the signals used in the device according to the invention.

With reference to FIG. 1, signals are applied to the repeater input in the form of a succession of alternately positive or negative signals which may or may not be separated by zero-amplitude signals as shown in diagram *a* in FIG. 1. An amplifier preceding and not forming part of the device according to the invention separates the signals into two groups, one group having positive polarity and reproducing the amplitudes of the positive signals (diagram *b*) and a second group, also having positive polarity, and reproducing the amplitudes of the negative signals (diagram *c*). The two groups of signals supply the two insulated input terminals of the device according to the invention. The signal collected at the output terminals of the device is as shown in diagram *d;* its wave form is identical with that shown in diagram *a*, after restoring the initial polarities of the signals applied to the repeater input.

Figure 2:
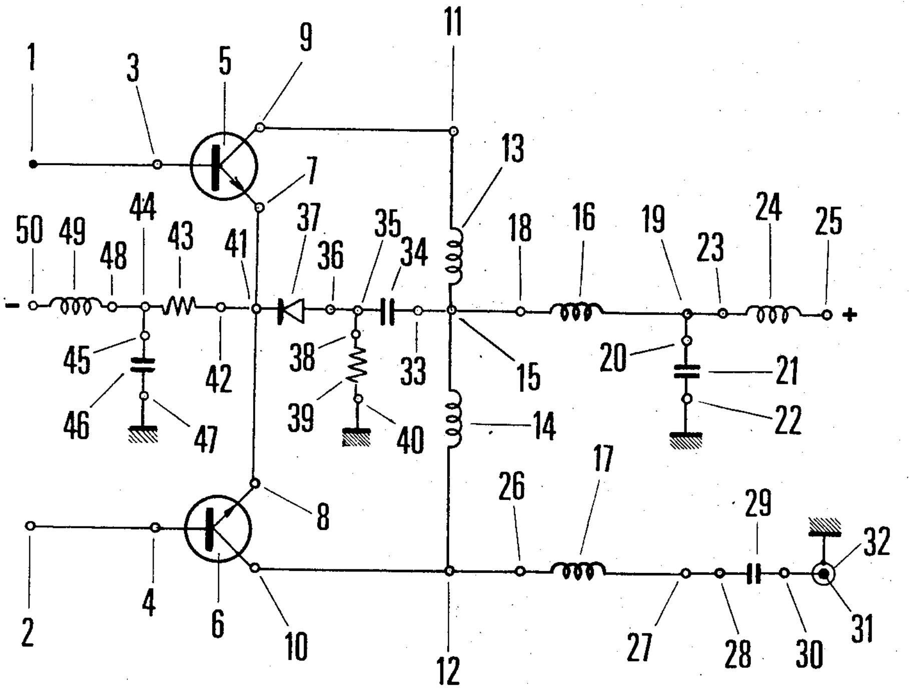
FIG. 2 shows the circuit of the device according to the invention in its simplest form.

With reference to FIG. 2, the input terminals 1, 2 of the device according to the invention are respectively connected to the bases 3, 4 of transistors 5, 6. Emitters 7, 8 of transistors 5, 6 are connected to one another by a common connection, whereas their collectors 9, 10 are respectively connected to the ends 11, 12 of a differential coupler winding 13–14 having a mid-point 15. Consequently, the differential coupler is made up of four windings 13, 14, 16 and 17. Windings 13, 14 are coupled together and also have a common terminal 15 already called the mid-point. Winding 16 is coupled to winding 17, from which it is insulated, and its terminal 18 is connected to the common terminal 15 of windings 13, 14 and its terminal 19 is connected to the terminal 20 of a capacitor 21 having a second terminal 22 connected to earth. Terminal 19 is also connected to terminal 23 of inductor 24 having a second terminal 25 connected to the positive terminal of a d.c. supply battery, the other terminal of which is grounded. Winding 17 coupled to winding 16 has a terminal 26 connected to the terminal 12 of winding 14 and has a second terminal 27 connected to a terminal 28 of a connecting capacitor 29 whose other terminal 30, constituting the insulated output terminal of the device according to the invention, is connected to the internal conductor 31 of a coaxial line 32 which is the transmission line to which the output signals of the device are applied. Elements 21 and 24 act as low-pass filters for protecting the installation against any interfering signals from the battery connected to terminal 25.

Furthermore, the mid-point 15 of winding 13–14 is connected to a terminal 33 of a capacitor 34 having a second terminal 35 which is connected firstly to one of the terminals 36 of a diode 37 and secondly to a terminal 38 of a resistor 39 having a second terminal 40 connected to ground. The time constant resulting from the values of elements 34, 39 should be large with respect to the duration of an elementary signal.

The other terminal 41 of diode 37 is connected firstly to the emitters 7, 8 of transistors 5, 6 and secondly to a terminal 42 of a bias resistor 43 whose second terminal 44 is connected firstly to a terminal 45 of a capacitor 46 whose other terminal 47 is connected to ground and secondly to a terminal 48 of an inductor 49 whose second terminal 50 is connected to the negative pole of a d.c. supply battery whose other pole is grounded. Elements 46, 49 act as low-pass filters protecting the installation against any interfering signals from the last-mentioned battery.

Figure 3:
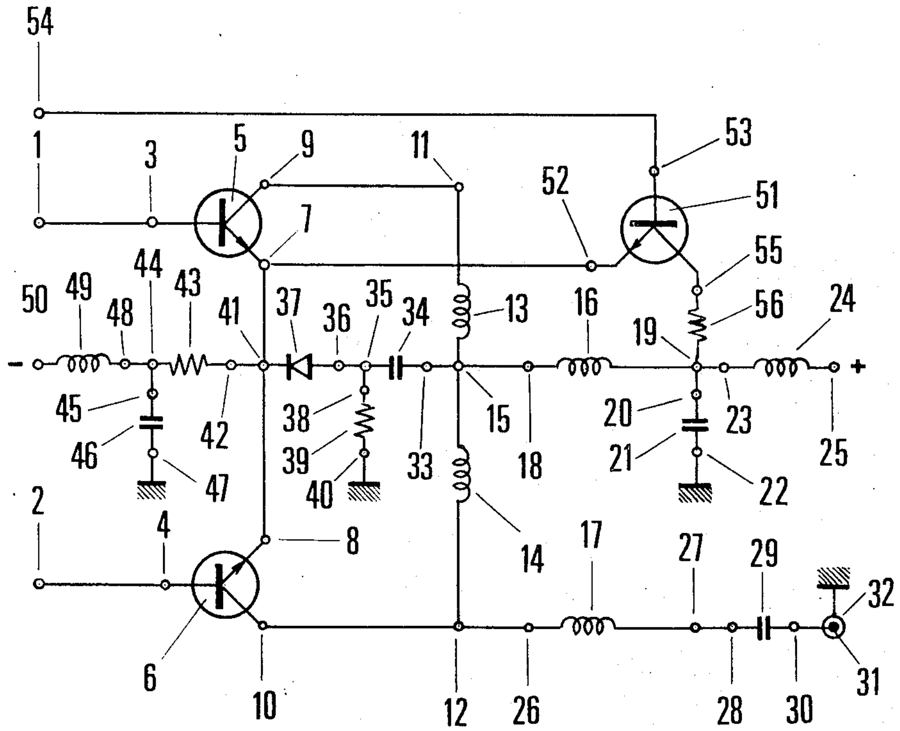
FIG. 3 shows the circuit of the device according to the invention in an improved form.

FIG. 3 shows an improved version of the device according to the invention. In FIG. 3, elements playing the same part as those in FIG. 2 bear similar reference numbers. The device shown in FIG. 3 comprises an additional transistor 51 whose emitter 52 is connected to the emitter 7 of transistor 5 which in turn is connected, as in the device shown in FIG. 2, to the emitter 8 of transistor 6. The base 53 of transistor 51 is connected to an additional supply terminal 54 permanently energized by a voltage which, with respect to ground, has a value comprised between the voltages of the signals supplying the input terminals 1, 2 – e.g. equal to half the sum of the two last-mentioned voltages. Collector 55 of transistor 51 is connected to terminal 19 of the differential coupler winding 16 through a resistor 56. The additional transistor 51 has a double function - it is used where the device is on stand-by, and it increases the speed of transition between signals of different polarity.

The advantage of reducing current consumption is a very important one, especially where there are a large number of regenerative repeaters for high-speed data transmission, disposed very near one another along a transmission line. The regenerative repeater according to the invention has a particularly low consumption, due mainly to the use of diode 37.

The reduction in supply current can be explained as follows.

Referring to FIG. 3, let us assume that diode 37 be removed, and that the signal train of line (*a*) of FIG. 1 is to be amplified. This train may be decomposed into two trains each having a single polarity, shown at (*b*) and (*c*) in FIG. 1, after reversing the polarity of the negative signals. These trains are respectively applied to the bases 3 and 4 of transistors 5 and 6. A zero logic level will be, for instance, taken equal to −1.6 V (with respect to ground), while a "one" logic level will be taken equal to −0.8 V (the signals applied to bases 3 and 4 of transistor 5 and 6 thus having an amplitude of 0.8 V). The base of transistor 51 will be kept at a constant potential, for instance −1.2 V, with respect to ground.

During the time interval corresponding to the duration of the first signal of line (*a*) of FIG. 1, a level "one" representing the elementary signal +1 of the message to be amplified is applied to the base 3 of transistor 5, while a zero-level is applied to base 4 of transistor 6.

The collector current of 5 increases, which also increases the potential of the common point 41 to the emitters of the three transistors, Consequently, transistors 6 and 51 pass to the blocked condition, while current flows through transistor 5. The signal received between the output terminal 31 and earth will be a (+1) elementary signal as shown on line (*b*) of FIG. 1. The signal received between terminal 33 and ground will have the zero-level, as shown on line (*c*) of FIG. 1.

During the next time interval (zero-signal on line (*a*) of FIG. 1) a zero-level signal is applied to bases 3 and 4 of transistors 5 and 6, which pass to the blocked condition, while current flows through transistor 51. A zero-level signal appears between 31 and ground and a "one" signal between 33 and ground.

During the following time interval (first negative signal on line (*a*) of FIG. 1) transistors 5 and 51 are in the blocked condition, and current flows through transistor 6. This results in a (−1) output signal between terminal 31 and ground (as shown on line (*d*) of FIG. 1), and in a zero-signal between terminal 35 and ground.

The signal received between terminal 35 and ground will have the wave shape shown on line (*d*) of FIG. 1. The potential of point 41 (the common point to the emitters of the three transistors) is somewhat between (−1.5) V and (−1.9)V, according to which of the three transistors is the conducting one, assuming the voltage between the base and emitter of the latter transistor to be about 0.7 V.

If points 35 and 41 are now interconnected by a diode, the cathode of which is connected to point 41, it is easily seen that, during the second of the time intervals above-referred to, current will flow through resistor 43 through the latter diode, consequently reducing the current intensity supplied by transistor 51. During the first and third above-mentioned time intervals, the diode will remain in the non-conducting condition. This obviously results in a decrease in the average d.c. intensity supplied by the battery connected between 25 and ground.

This applies to the arrangement of FIG. 3 and also to that of FIG. 2, which can be derived from that of FIG. 3 simply by suppressing transistor 51.

What we claim is:

1. A device for amplifying digital signals having two pairs of input terminals and one pair of output terminals which can be connected to a transmission line, in which each pair of input and output terminals comprises an insulated terminal and a reference-potential terminal, said device comprising two transistors having the same type of conductivity, the bases of which are respectively connected to one of said insulated terminals in said pairs of input terminals and the emitters of which are connected by a common connection; said device further comprising:

a directional four-port coupler having four pairs of terminals comprising a first, a second, a third and a fourth insulated terminal respectively and having a common ground terminal, said coupler comprising, firstly, a single-winding transformer having a mid-point, the ends of the winding of which form said first and second terminals and, secondly, a transformer having two separate windings, the first of which connects said third terminal to said mid-point and the second of which connects said fourth terminal to said second terminal;

two connections respectively connecting the transistor collectors to said first and second terminals respectively;

a first and a second d.c. voltage source having opposite polarities and having a common grounded terminal, their other terminals being respectively connected by low-pass filter means, firstly to said third terminal and secondly to said common connection via a bias resistor;

said insulated ouput terminal being connected by a connecting capacitor to said fourth terminal, and said device also comprising a matching impedance including a capacitor and a matching resistor in series-connection and forming an assembly which connects said mid-point to ground;

said device being characterized in that said common point of said capacitor and matching resistor is connected to said common connection by a semiconducting diode connected in its direct conduction direction.

2. An amplifier device according to claim 1, in which a third transistor, having the same type of conductivity as said two transistors, has its base connected to a point at a fixed potential with respect to ground, the potential of latter said point being intermediate between the exteme base potentials applied to said two transistors, and has its emitter connected to the emitters of said two transistors and its collector connected to said third terminal via a further resistor.

3. An amplifying device according to claim 2, in which said intermediate potential is substantially equal to half the sum of said extreme potentials.

* * * * *